United States Patent [19]
Pilgrim et al.

[11] Patent Number: 6,103,276
[45] Date of Patent: Aug. 15, 2000

[54] METHODS OF PRODUCING MEAT AND EGG PRODUCTS WITH ENHANCED NUTRITIONAL QUALITY

[75] Inventors: Lonnie A. Pilgrim; James J. Miner, both of Pittsburg; Mary E. Van Elswyk, Bryan, all of Tex.

[73] Assignee: Pilgrim's Pride Corporation, Pittsburgh, Tex.

[21] Appl. No.: 09/258,885

[22] Filed: Mar. 1, 1999

Related U.S. Application Data

[62] Division of application No. 08/778,764, Jan. 6, 1997, abandoned.

[51] Int. Cl.$^7$ .............................. A23K 1/24; A23K 1/18; A23L 1/32
[52] U.S. Cl. ............................ 426/2; 426/623; 426/630; 426/635; 426/807; 426/614
[58] Field of Search ................................ 426/2, 623, 630, 426/635, 807, 614

[56] References Cited

U.S. PATENT DOCUMENTS

| | | | |
|---|---|---|---|
| 4,738,853 | 4/1988 | Horrobin | 426/2 |
| 4,918,104 | 4/1990 | Weiss et al. | 514/560 |
| 5,012,761 | 5/1991 | Oh | 426/2 |
| 5,069,903 | 12/1991 | Stitt | 426/623 |
| 5,132,120 | 7/1992 | Salte et al. | 426/2 |
| 5,133,963 | 7/1992 | Ise | 424/94.61 |
| 5,246,717 | 9/1993 | Garwin | 426/2 |
| 5,290,573 | 3/1994 | Holub | 426/2 |
| 5,340,594 | 8/1994 | Barclay | 426/49 |
| 5,415,879 | 5/1995 | Oh | 426/2 |
| 5,547,686 | 8/1996 | Jenkins | 426/2 |
| 5,626,891 | 5/1997 | Aii et al. | 426/2 |

FOREIGN PATENT DOCUMENTS

| | | | |
|---|---|---|---|
| 4-360653 | 12/1992 | Japan | 426/614 |
| 6-237703 | 8/1994 | Japan | 426/614 |
| 8-80164 | 3/1996 | Japan | 426/614 |
| WO 96/00016 | 1/1996 | WIPO | 426/614 |
| WO 96/38051 | 5/1996 | WIPO . | |

OTHER PUBLICATIONS

"Observations on the Cholesterol, Linoleic and Linolenic Acid Content of Eggs as Influenced by Dietary Fats," H. Fisher et al., Paper of the Journal Series, Apr. 5, 1957, pp. 119–129.

"Looking ahead: Will eggs become a dietary alternative to fish?", M. Van Elswyk, *egg industry,* Sep./Oct. 1994, pp. 21–24.

"Research Note: Dietary Flax and Egg Composition," L. Caston et al., *Poultry Science,* 69 (1990), pp. 1617–1620.

"Yolk Thiobarbituric Acid Reactive Substances and n–3 Fatty Acids in Response to Whole and Ground Flaxseed," W. M. Aymond et al., *Poultry Science,* 74 (1995), pp. 1388–1394.

"Egg Flavor Quality as Affected by Fish Meals or Fish Oils in Laying Rations," H. H. Koehler et al., *Poultry Science,* 54 (1975), pp. 881–889.

"Metabolism and Nutrition: Dietary Menhaden Oil Contributes to Hepatic Lipidosis in Laying Hens," M. E. Van Elswyk et al., *Poultry Science,* 73 (1994), pp. 653–662.

"Oxidative Stability and Sensory Quality of Stored Eggs From Hens Fed 1.5% Menhaden Oil," A. C. Marshall et al., *Journal of Food Science,* vol. 59, No. 3, 1994, pp. 561–563.

"Dietary Menhaden Oil Influences Sensory Characteristics and Headspace Volatiles of Shell Eggs," M. E. Van Elswyk et al., *Journal of Food Science,* vol. 60, No. 1, 1995, pp. 85–89.

"Dietary Modification of Yolk Lipid with Menhaden Oil," P.S. Hargis et al., *Poultry Science,* 70 (1991), pp. 874–883.

"Influence of Graded Levels of Dietary Linoleic and Linolenic Acids on the Fatty Acid Composition of Hens' Eggs," N. L. Murty et al., *Journal of Nutrition,* 75 (1961), pp. 287–294.

"Influence of Dietary Linoleic Acid on Egg Fatty Acid Composition in Hens Deficient in Essential Fatty Acids," D. Balnave, *J. Sci. Fd. Agric.,* vol. 19, May 1968, pp. 266–269.

"Fish Oil and Fishy Flavor of Eggs and Carcasses of Hens," A. Holdas et al., Journal Paper No. 486, May 16, 1966, pp. 1405–1407.

"Altered Fatty Acid Metabolism in Patients with Angiographically Documented Coronary Artery Disease," E. N. Siguel et al., *Metabolism,* vol. 43, No. 8 (Aug.), 1994, pp. 982–993.

"'Eggstasy' Egg Technology Receives Patent," *Poultry Times,* Dec. 16, 1996.

"Change in Ratio of .omega.3 and .omega.6 Fatty Acids in Human Plasma After Intake of Hen's Egg Rich in .alpha-.–linolenate", K. Suzuki et al., *Journal of Japanese Society of Nutrition and Food Science,* 1995, Summary.

"Effect of an Increase of Dietary Linseed Oil on Fatty Acid Composition and .alpha.–tocopherol in Hen's Egg Yolk," *Journal of Japanese Society of Nutrition and Food Science,* 1994, Summary.

*Primary Examiner*—Arthur L. Corbin
*Attorney, Agent, or Firm*—Evenson, Mc Keown, Edwards & Lenahan, P.L.L.C.

[57] ABSTRACT

The invention relates to livestock feed compositions and methods for producing food products of improved nutritional quality from the livestock. Specifically, in one embodiment, feed compositions comprising whole flaxseed and dietary grit, and further comprising menhaden oil, soybean oil, and vitamin E, can be used to produce chicken eggs with improved essential fatty acid and vitamin E contents. The eggs so produced score favorably when compared to control eggs in taste tests. Furthermore, there is no reduction in egg production from the chickens fed a diet of the compositions disclosed.

19 Claims, No Drawings

METHODS OF PRODUCING MEAT AND EGG PRODUCTS WITH ENHANCED NUTRITIONAL QUALITY

This application is a division of application Ser. No. 08/778,764, filed Jan. 6, 1997, now abandoned.

BACKGROUND OF THE INVENTION

1. Technical Field of the Invention

The invention relates to the field of livestock feed compositions and the field of consumer food products.

2. Introduction

Consumer's health concerns related to the nutritional content of meat and egg products have forced the livestock industry to examine more ways to modify those products. One modification technique control the dietary supplements in livestock feed. By employing the methods and feed compositions of this invention, the livestock industry can enhance the nutritional characteristics of meat and egg products destined for the consumer. Specifically, in certain embodiments, the invention involves food products simultaneously enriched with the essential omega-6 fatty acid, linoleic acid (18:2n-6), the essential omega-3 fatty acid, linolenic acid (18:3n-3), and the metabolic derivative of linolenic acid, docosahexanoic acid (22:6n-3). For example, we described feed compositions and livestock feeding methods comprising whole flaxseed in combination with grit to promote in vivo release of essential fats from the flaxseed. The invention also involves livestock diets designed to result in food products containing supplementary levels of vitamin E and/or other natural antioxidants as well as natural pigments. Surprisingly, eggs from hens fed a diet of this invention maintain good egg production and the eggs compared favorably with typical eggs in blind taste tests even though they contain significant differences in essential fatty acids and vitamin E.

DESCRIPTION OF RELATED ART

The key to a good diet is balance. A balanced diet means that one is getting all the nutritional requirements. Certain nutrients are dietarily expendable since they can be synthesized in the body. Others are considered essential as the body lacks the capacity to produce them in adequate amounts to support normal metabolism. In developed countries, such as the U.S., a balanced diet has been largely taken for granted due to the variety and amount of food available to the consumer.

Recently, however, diet has been recognized as an important factor in both the prevention and progression of chronic disease. This has led to several shifts in normal, balanced eating patterns. For example, dietary guidelines suggesting a reduction in total dietary fat (to <30% of calories) to reduce the risk of heart disease has resulted in consumer fat intake being reduced from 40–44% of total calories to 36%. This reduction has largely been achieved by replacing high fat foods with high carbohydrate foods. While this trend has seemingly positive impacts on the risk of heart disease, the absence of concentrated sources of dietary fat inadvertently excludes the important essential fats from the diet and, thus, unbalances the diet. In addition, limiting dietary fat also reduces the availability of naturally occurring antioxidants, such as vitamin E, which are also essential nutrients.

Therapeutic Diets: Essential Fatty Acids and Antioxidants

Data from the Framingham cohort study suggest a negative correlation between plasma essential fatty acids and the risk of heart disease (Siguel and Lerman, Metabolism 43: 982–993 (1994)). Specifically, individual with angiographically documented heart disease were found to have insufficient circulating levels of the essential omega-6 fatty acid, linoleic acid. Classic deficiency products, specifically, mead acid (20:3n-9), were also found in measurable amounts. From this data, these researchers concluded that plasma essential fatty acid levels could serve as a diagnostic tool in the prevention of heart disease and that managing those levels could be a therapy for heart disease prevention.

The idea of dietary fatty acids as therapy for the alleviation of heart disease is not new. Epidemiological data from the 1970's and more recent clinical data implicate the essential omega-3 fatty acid (linolenic) and it's metabolic derivatives (eiocosapentaenoic acid 20:5n-3 and docosahexanoic acid) in risk reduction for coronary heart disease. Dietary omega-3 fatty acids are believed to limit the production of inflammatory and aggregatory eicosanoids by the body and, thus, reduce both blood pressure and blood clot development. Most recently, the enrichment of cardiac membranes with omega-3 fatty acids has been found to stabilize them against arrhythmias and provide protection against myocardial fibrillation. Abundant dietary sources of omega-3 fatty acids are limited to cold water fish, especially fatty fish. Unfortunately, fish consumption in the U.S. is limited. Many people fine it difficult to afford fish, others find the taste objectionable, and still others have limited regional access to fresh fish. Consequently, the U.S. per capita fish consumption levels are far below the two or more 100 gram servings of fish recommended as healthful in epidemiological studies.

In addition to dietary fatty acids, vitamins have also recently gained recognition as nutrients useful in the fight against heart disease. Clinical and epidemiological data suggest that supplementary vitamin E reduces the oxidation of circulating low density lipoprotein particles (LDL). It is this role as an antioxidant that causes vitamin E to be useful in reducing the risk of heart disease. The prevention of LDL oxidation is believed to limit the incorporation of LDL-cholesterol into atherosclerotic plaques. Limiting the amount of cholesterol available for plaque deposition retards the progression of plaques into occlusive lesions capable of constricting blood flow and inducing myocardial infarction.

Food Products for Therapeutic Diets

In response to the decreasing availability of concentrated food sources containing essential omega-6 and omega-3 fatty acids and vitamin E, health professionals have recommended the development and production of low-fat foods rich in these important nutrients. Such a goal can be accomplished through directly manipulating processed products or through modifying livestock rearing practices, which leads to improved food products from the livestock.

One method for modifying food products from livestock consists of controlling and supplementing the livestock diet. In fact, among monogastric animals like poultry and swine, the ability to modify the amount of tissue fatty acids and fat soluble vitamins through dietary manipulation provides an exciting opportunity to improve the quality of our food supply. However, prior attempts at improvement resulted in some significant drawbacks. For example, Ise, U.S. Pat. No. 5,133,963, discusses a method for enhancing solely the omega-3 fatty acid content in chicken eggs by using dietary menhaden oil. The known complications of feeding high levels of omega-3 fatty acid included reduced egg production and reduced egg weights. To overcome these complications, Ise discusses the necessity of a separate, pharmacological supplementation of siliac acid, glucanase, cellulase, calcium, and phosphorus. The supplementation apparently maintains an acceptable flock production, however, its requirement is a drawback.

Another drawback is discussed in Stitt, U.S. Pat. No. 5,069,903. That method requires grinding flaxseed and then using the ground flaxseed in human and animal diets to provide therapeutic and nutritional benefits. However, grinding flaxseed inherently reduces the stability of the essential fats to oxidation and thereby diminishes the usefulness of dietary flaxseed as a nutritive agent. Therefore, extreme care must be taken to avoid high levels of oxidation and rancidity. Stitt also notes that there are no benefits to using whole, raw flaxseed.

Garwin, U.S. Pat. No. 5,246,717, discusses methods that apparently enhance egg yolk vitamin E and iodine. However, the method requires dietary supplementation only in combination with increased iodine for at least three to four weeks prior to egg production. Thus, costs are correspondingly increased. Garwin reports no effect on omega-3 or omega-6 fatty acid levels in the eggs and does not indicate how to combine the feed compositions and methods to increase the content of these essential fatty acids in eggs.

In summary, prior methods and compositions in this area do not discuss a commercially useful method for the production of meat and eggs rich in each of essential omega-3 and omega-6 fatty acids, and vitamin E. Thus, a need in the art exists for improved methods and feed compositions used in creating better meat and egg products for the consumer.

SUMMARY OF THE INVENTION

It is a primary objective of the present invention to overcome the disadvantages and drawbacks of the prior methods in order to provide nutritionally improved meat and egg products. Accordingly, the feeding methods and combinations of ingredients we described herein can result in more nutritional consumer food products. Thus, the invention comprises, inter alia, meat and egg products of various forms, methods of feeding livestock, methods of designing livestock diets, livestock feed compositions, and methods for producing meat and eggs from livestock. Further embodiments can be easily derives from the descriptions herein, alone and combined with the teachings of some prior methods. The inventors do not limit the scope of their invention to the specific examples or descriptions found in this application.

By addressing some of the specific drawbacks of the prior methods, some of the embodiments of this invention employ lower levels of menhaden fish oil in combination with other essential fatty acid sources, namely soybean oil, in feeding methods and compositions. As notes above, prior methods resulted in negative consequences to egg production (Ise, U.S. Pat. No. 5,133,963). The practice of this invention requires no separate supplementation with enriched water, as Ise discusses. Also, increased levels of iodine are not required in our method.

We also describe the combined use of whole flaxseed and grit, which promotes the grinding of flaxseed in vivo, in order to protect the essential fats from oxidation (see Stitt, U.S. Pat. No. 5,246,717). Thus, we have increased the ability to produce food products with high levels of essential fatty acids (omega-3 and omega-6) without reducing production and without requiring increased dietary supplementation costs and procedures. In addition, when used in poultry feed, the current methods yield chicken eggs that serve as an excellent source of vitamin E as defined by the U.S. Food and Drug Administration. As in the case of vitamin E, the levels of other antioxidants and natural pigments can also be increased in eggs with the practice of this invention.

Ocean fish is the only abundant source of omega-3 fatty acids currently available in the consumer diet for use in therapeutic and preventative diets in the fight against heart disease. Enhancing yolk omega-3 fatty acids in the described manner results in the production of eggs that can serve as an economical alternative to fish in the diet for the consumption of omega-3 fatty acids. The current invention also describes a feeding method for the production of shell eggs that can serve as an excellent source of dietary vitamin E. Abundant sources of vitamin B are limited to vegetable/seed oils and wheat germ. Limitation of fat in therapeutic diets designed to reduce heart disease invariably limit the availability of the important antioxidant nutrient vitamin E.

For example, in one embodiment the feeding methods and compositions of our invention result in the commercial production of eggs with significantly enhanced amounts of essential omega-6 and omega-3 fatty acids as well as vitamin E. When the diets described herein are fed to laying poultry, they produce eggs with enhanced levels of certain essential fatty acids, vitamin E, and other antioxidants. These eggs may be useful supplements to the diets of health conscious individuals who currently consume a low-fat diet and, consequently, limit their intake of essential fatty acids.

It is a further objective of this invention to produce a poultry egg containing approximately twice the naturally occurring omega-6 fatty acids as a typical shell egg through the use of dietary soybean oil. An additional objective of the present method is to feed flaxseed whole, in combination with dietary grit, to maintain lipid stability while promoting yolk deposition of essential omega-3 fatty acids from flaxseed. A further objective is the enhancement of yolk omega-3 fatty acids without consequential reductions in hen productivity to yield an egg that can substitute for fish in the human diet. And, it is also an objective of the current invention to develop a poultry egg that will serve as an excellent source of dietary vitamin E. More specifically, the methods of the present invention includes feeding laying hens a diet simultaneously enriched with dietary omega-6 and omega-3 fatty acids as well as dietary vitamin E for the production of nutritionally enhanced shell eggs on a commercially acceptable basis.

For purposes of this invention, "livestock" means monogastric animals capable of providing meat or egg products for industrial use or human consumption and includes poultry and swine. Grit functions to provide a course material that can aid in the grinding process in poultry and therefore make the components of the flaxseed more easily digested and absorbed. Grit is recognized as either a soluble or insoluble material or a combination of both. An example of soluble grit is oyster shell. Examples of insoluble grit are granite, feldspar, and silica. Insoluble grit may function only as an aid in grinding while some soluble grit, such as oyster shell, may aid in grinding as well as furnish a slow release of calcium.

Flaxseed (*Linurn usitatissimum*) is a flat oval seed with pointed tip that measures approximately 2.5×5×1 mm and includes, for example, yellow and red cultivars. It is native to North America and Canada. The seeds may be about 45% fat by weight. For the purpose of this invention, flaxseed can be a seed as described above or can be functionally defined as a seed with a good source of linolenic acid (18:3n-3) or one that provides for the metabolic derivation of docosahexanoic acid (22:6n-3) from linolenic acid.

As used in this invention, an egg product or a meat product can be any food that comprises some part of an egg or some meat. For example, an egg product can be dried or reconstituted egg extracts, frozen egg extracts, or a product produced by using all or part of an egg. Similarly, meat product can be dried or reconstituted meat, extracts of meat, or a product produced by using some meat. The amount of egg or meat in an egg product or a meat product is not particularly important.

The following description, specific examples, results, and the foregoing discussion enable one skilled in the art to practice this invention as claimed and disclosed herein.

DETAILED DESCRIPTION AND SPECIFIC EMBODIMENTS OF THE INVENTION

In one aspect of the invention, the use of 2.5 to 3.75%, adjusting the weight percentage according to feed consumption, whole flaxseed in combination with supplemental granite rock residuals (i.e. grit) promotes yolk linolenic acid deposition (Table 1). In one aspect of the invention, the addition of grit exploits the ability of hens to efficiently grind foodstuffs in the muscular ventriculus.

According to a feeding method outlines in the present invention, laying hens are fed diets containing soybean oil as 7.5–11.25% of the diet, adjusting the weight percentage according to feed consumption, in combination with other essential fatty acid sources to be discussed. The addition of soybean oil to laying hen rations results in the production of shell eggs containing the amount of linoleic acid found in a typical egg. For example, laying hens fed the first experimental ration (Trial 1) outlined in Table 1 yielded eggs containing 1330 mg linoleic acid per yolk as compared to only 800 mg per yolk in a typical egg (see Table 3). The final experimental diet (Trial 2 of Table 1) yielded a minimum deposition of 1230 mg linoleic acid per yolk. Egg yolks containing enhanced levels of linoleic acid may become important sources of essential omega-6 fatty acids in human diets. In addition to enhancing the nutritional quality of the eggs, dietary omega-6 fatty acid supplementation from soybean oil also helps maintain yolk and total egg weight of fatty acid modified eggs in the range of typical eggs (Table 2). Unlike Stitt, U.S. Pat. No. 5,133,963, discussing the supplementation of essential omega-3 fatty acids and subsequent detriments to egg and yolk weights, the current invention allows for the enhancement of yolk omega-3 fatty acids without the undesirable side-effects by, for example, simultaneously supplementing omega-6 and omega-3 fatty acids.

The current invention provides a feeding method that not only promotes yolk essential omega-3 fatty acids but also retains yolk oxidative stability. Specifically, the current method uses 1–1.5% alkali refined, bleached and pressed, feed grade menhaden oil, adjusting the weight percentage according to feed consumption, stabilized with 500 ppm ethoxyquin (Table 1), to promote the deposition of omega-3 fatty acids similar to that found in a typical serving of fish. Using this modest level of dietary menhaden oil promotes yolk deposition of omega-3 fatty acids while maintaining the reproductive integrity of the hen, unlike the diet outlined in U.S. Pat. No. 5,133,963, which provided up to 5% of the diet as menhaden oil. Eggs produced by hens fed the above omega-3 fatty acid sources contain 110–120 mg/yolk linolenic acid and 110–120 mg/yolk docosahexanoic acid (Table 3). The total omega-3 fatty acid content therefore equals approximately 250 mg/yolk which is equivalent to that found in a serving of lean ocean fish.

Experimental Details and Results

Experimental diets outlined in Trail 1 contained supplementary vitamin E that resulted in the production of eggs containing about 6 I.U. more vitamin E than a typical egg. The experimental diet outlined in Trial 2 includes the use of 0.075% of supplement containing 125,000 I.U./lb. of vitamin E as alpha-tocopherol acetate for the production of egg yolks that contain between 7–8 I.U. of vitamin E. A typical egg only contains an average of 1 I.U. vitamin E per yolk. Enhancing yolk vitamin E content, as described in the invention, results in the production of a shell egg that provides at least 20% of the Recommended Daily Intake for vitamin E and as such is categorized as an excellent source of this important nutrient by U.S. Food and Drug Administration standards.

Table 1 indicates the ingredients and the percent of each that make up the control and experimental diets (certain ingredients are described below the table, as indicated by 1–5.

TABLE 1

| INGREDIENT | CONTROL wt. % | TRIAL 1 wt. % | TRIAL 2 wt. % |
|---|---|---|---|
| Ground Corn | 58.15 | 35.7 | 22.38 |
| Soybean Meal (47.5%) | 25.95 | 25.47 | 22.38 |
| Wheat Midds | | 14.15 | 25.00 |
| Limestone | 8.76 | 9.06 | 9.29 |
| Poultry Fat | 4.00 | | |
| Streptomycin Ferm. Solubles | 0.62 | 0.62 | 0.62 |
| Soybean Oil | | 7.5 | 11.25 |
| Flaxseed (whole) | | 2.5 | 3.75 |
| Dicalcium Phosphate (18.5%) | 1.59 | 1.73 | 1.54 |
| Fish Oil (Menhaden Oil) | | 1.00 | 1.50 |
| Salt | 0.46 | 0.59 | 0.57 |
| Methionine Hydroxy Analog (88%) | 0.27 | 0.29 | 0.27 |
| Copper Sulfate | 0.05 | 0.05 | 0.05 |
| Trace Minerals (1) | 0.05 | 0.05 | 0.05 |
| Vitamin Premix | 0.02 layer (2) | 0.04 breeder (3) | 0.04 breeder (3) |
| Choline - 70% | 0.06 | 0.04 | 0.02 |
| Bactacin MD - 50 g/lb | 0.01 | 0.01 | 0.01 |
| Ethoxyquin | 0.01 | 0.0125 | 0.0125 |
| Vitamin E 125,000 IU/lb | | | 0.075 |
| Naturex ™ (4) | | 0.025 | 0.025 |
| Orange Glo ™ (5) | | 0.160 | 0.160 |
| Granite Grit | | 1.0% | 1.0% |
| TOTAL | 100.00% | 99.9975% | 99.9925% | footnotes to Table 1:
(1) Poultry Trace Mineral Premix:

| | |
|---|---|
| Manganese (Mn) Min | 18.00% |
| (5.00% Mn form Manganese Sulfate) | |
| Zinc (Zn Min) | 20.00% |
| (5.00% Zn form Zinc Sulfate) | |
| Iron (Fe) Min | 6.50% |
| Copper (Cu) Min | 1.00% |
| Iodine (I) Min | 0.30% |
| Selenium (Se) Min | 0.04% |
| Calcium (Ca) | Carrier |

Ingredients
Manganous Oxide, Manganese Sulfate, Zinc Oxide, Zinc Sulfate, Ferrous Sulfate, Copper Sulfate, Calcium Iodate, Sodium Selenite, Calcium Carbonate.

(2) Layer Premix Guaranteed Analyses:

| | PER POUND |
|---|---|
| Vitamin $A_1$ I.U. | 12,000,000 |
| Vitamin, $D_3$, I.U. | 4,000,000 |
| Vitamin E, I.U. | 6,000 |
| Vitamin $B_{12}$, mg. | 12 |
| Riboflavin, mg. | 6,000 |
| Niacin, mg. | 24,000 |
| d-Pantothenic Acid, mg. | 10,000 |
| (Calcium d-Pantothenate, mg. 10,870) | |
| Mendadione, mg. | 1,980 |
| (Menadione Sodium Bisulfite Complex, mg. 6,000) | |
| Folic Acid, mg. | 400 |
| d-Biotin, mg. | 40 |

TABLE 1-continued

Ingredients:
Ground Rice Hulls, Calcium Carbonate, Mineral Oil, Vitamin A Acetate in Gelatin-Sugar-starch Beadlet (preserved with Ethoxyquin), Vitamin A Acetate with D-activated Animal sterol (source of Vitamin $D_3$) in Gelatin-Sugar-Starch Beadlet (preserved with Ethoxyquin), Vitamin E Supplement, Vitamin $B_{12}$ Supplement, Riboflavin Supplement, Niacin Supplement, Calcium Pantothenate, Menadione Sodium Bisulfite Complex, Folic Acid, d-Biotin.

| (3) Breeder Premix Guaranteed Analysis: | PER POUND |
|---|---|
| Vitamin A, I.U. | 9,334,000 |
| Vitamin $D_3$, I.U. | 4,000,000 |
| Vitamin E, I.U. | 40,000 |
| Vitamin $B_{12}$, Mg. | 20 |
| Riboflavin, mg. | 9,334 |
| Niacin, mg. | 33,334 |
| d-Pantothenic Acid, mg. | 14,667 |
| (Calcium d-Pantothenate, mg. 15,943) | |
| Menadione, mg. | 1,760 |
| (Menadione Sodium Bisulfite Complex, mg. 5,334) | |
| Folic Acid, mg. | 1,067 |
| Pyridoxine, mg. | 2,666 |
| (Pyridoxine Hydrochloride, mg. 3,240) | |
| Thiamin, mg. | 2,001 |
| (Thiamin Mononitrate, mg. 2,178) | |
| d-Biotin, mg. | 167 |

Ingredients:
Ground Rice Hulls, Calcium Carbonate, Mineral Oil, Vitamin A Acetate in Gelatin-Sugar-Starch Beadlet (preserved with Ethoxyquin), Vitamin A Acetate with D-activated Animal Sterol (source of Vitamin $D_3$) in Gelatin-Sugar-Starch Beadlet (preserved with Ethoxyquin), D-activated Animal Sterol (source of Vitamin $D_3$), Vitamin E Supplement, Vitamin $B_{12}$ Supplement, Riboflavin Supplement, Niacin Supplement, Calcium Pantothenate, Menadione Sodium Bisulfite Complex, Folic Acid, Pyridoxine Hydrochloride, Thiamin Mononitrate, d-Biotin.

(4) Kemin Industries brand Naturox Antioxidants (composed of a natural source of tocopherols)
(5) Kemin Industries brand Orange-Glo Natural Pigments (composed of natural oxycarotenoids; lutein most predominate of these carotenoids)

Hens were fed the experimental diets for a period of 4 weeks before the collection of the eggs for analysis. Trial 1 was over a 10 week period and Trial 2 was over a 16 week period. In each trial, eggs for analysis were collected at random, on a weekly basis. The egg weight and yolk data presented in Table 2 is an average of the two trials.

TABLE 2

| DIET | Egg Weight | Yolk Weight |
|---|---|---|
| Typical | 59.7 ± 4 | 16.2 ± 1 |
| Experimental | 61.1 ± 4 | 16.6 ± 1 |

According to the results in Table 2, there is no reduction in egg production or size when the diets and compositions of this invention are used. In fact, the invention results in slightly larger eggs, which is unexpected when prior methods such as those in the Ise patent document, notes above, are considered.

Table 3 shows the result of an analysis of the essential fatty acids and vitamin E content of the eggs. This data is the average of the samples taken at random for the entire period of each trial. Analysis of the yolk fatty acids was as follows. Freeze dried yolks were directly methylated than extracted with organic solvent and quantified by gas liquid chromatography. Comparison to known standards was used for fatty acid identification. Numerous methods for identifying and quantifying fatty acid content in food sample are known in the art.

Yolk vitamin E analysis can be performed by a number of methods known in the art, including the methods discussed in the following references and modifications thereof: Cort, W. M., Vincents, T. S., Waysek, E. H., and Williams, B. D. Journal of Agricultural Food Chemistry 31: 1330–1333 (1983); Speeck, A. J., Schijver, J., and Schreurs, W. H. P., Journal of Food Science, 50: 121–124 (1985); McMurray, C. H., Blanchflower, W. J. and Rice, D. A., Journal of the Association of Official Analytical Chemist, 63: 1258–1261 (1980). As known in the art, 1 mg. D-Alpha-Tocopherol= 1.49 International Units (I.U.) of vitamin E.

TABLE 3

| | Typical Egg | Modified Egg Trial 1 | Modified Egg Trial 2 |
|---|---|---|---|
| 18:2 Linoleic | 807.0 mg | 1330 mg | 1230 mg |
| 18:3 Linolenic | 20.0 mg | 120 mg | 110 mg |
| 22:6 Docosahexanoic | 30.0 mg | 110 mg | 120 mg |
| Vitamin E | 0.73 I.U. | 1.78 I.U. | 7.90 I.U. |

These results indicate the advantageous levels of fatty acids and vitamin E in eggs produced from the methods, diets, and compositions of this invention. The modified eggs contain higher levels of each of the fatty acids and of vitamin E as compared to control, typical eggs. In addition, the increase in vitamin E levels of the eggs from Trial 2 indicates a particular advantage of the diet and composition used in Trial 2.

Comparative Taste Test

The nutritional profile of the eggs produced by the described feeding method are nutritionally superior to typical eggs. However, simply providing enhanced nutritional quality does not ensure that consumers will ultimately consume the eggs to obtain health benefits. If the eggs do not have an acceptable flavor quality, consumers will likely not buy or use them. We tested the consumer acceptability of these eggs in taste panels, directly comparing them with typical eggs. Untrained, consumer panelists were asked to score the flavor of these and typical eggs on an anchored hedonic scale from 1 to 9 with 1 referring to "dislike, extremely inedible," 5 referring to "neither like nor dislike," and 9 referring to "like extremely." In a series of four taste panels, involving over 100 consumer panelists, the scores for eggs produced by the current feeding method were 6.3 as compared to 6.0 for typical eggs. Eggs prepared for taste panel analysis contained no seasoning, which accounts for the low overall scores. Importantly, however, flavor scores of eggs from hens fed the diet outlined in the current method were higher than, or at least not significantly different from, typical eggs. This data indicates that eggs designed by the current feeding method are of acceptable flavor quality and, therefore, are an appealing source of essential omega-6 and omega-3 fatty acids and vitamin E in the diets of consumers.

What is claimed is:

1. A method for obtaining a chicken egg enriched with linoleic acid and linolenic acid, comprising feeding a chicken a diet comprising whole flaxseed, soybean oil, and grit.

2. A method according to claim 1, further comprising feeding the chicken a diet comprising at least one of menhaden oil, ethoxyquin, and vitamin E.

3. A method according to claim 2, wherein said diet comprises 1.0 to 1.5 wt. % menhaden oil and 500 ppm ethoxyquin.

4. A method according to claim 2, wherein the yolk of the chicken egg comprises 1.78 to 7.9 I.U. of vitamin E.

5. A method according to claim 1, wherein said diet comprises 2.5 to 3.7 wt. % whole flaxseed.

6. A method according to claim 2, wherein said diet comprises 7.5 to 11.25 wt. % soybean oil.

7. A method according to claim 1, wherein said grit is oyster shell.

8. A method according to claim 1, wherein said grit is selected from the group consisting of granite, feldspar, and silica.

9. A method according to claim 1, wherein the yolk of the chicken egg comprises 1330 mg to 1230 mg linoleic acid.

10. A method according to claim 1, wherein the yolk of the chicken egg comprises 100 to 120 mg linolenic acid.

11. A method according to claim 1, wherein the yolk of the chicken egg comprises 100 to 120 mg docosahexanoic acid.

12. A method for increasing linoleic acid and linolenic acid meat, comprising feeding poultry or swine a livestock feed composition comprising whole flaxseed, soybean oil, and grit.

13. A method for obtaining a chicken egg enriched with linoleic acid and linolenic acid, comprising feeding a chicken a diet consisting essentially of whole flaxseed, soybean oil, and grit.

14. A method for obtaining a chicken egg enriched with linoleic acid and linolenic acid, comprising:

feeding a chicken a diet comprising whole flaxseed, soybean oil, and grit;

grinding the flaxseed in vivo; and increasing the linoleic acid and linolenic acid in the yolk of an egg from the chicken.

15. A method according to claim 14, wherein the yolk of the chicken egg comprises 1330 mg to 1230 mg linoleic acid.

16. A method according to claim 14, wherein the yolk of the chicken egg comprises 100 to 120 mg linolenic acid.

17. A method according to claim 14, further comprising increasing the egg weight and the yolk weight.

18. A method according to claim 14, wherein said diet further comprises vitamin E, and said method further comprises increasing the vitamin E in the yolk of an egg from the chicken.

19. A method according to claim 18, wherein the yolk of the chicken egg comprises 1.78 to 7.9 I.U. of vitamin E.

* * * * *